(12) United States Patent
Keene (10) Patent No.: US 11,550,074 B2
(45) Date of Patent: Jan. 10, 2023

(54) FERROMAGNETIC SENSING (71) Applicant: Metrasens Limited, Worcestershire (GB)

(72) Inventor: Mark Nicholas Keene, Worcestershire (GB)

(73) Assignee: Metrasens Limited, Worcestershire (GB)

( * ) Notice: Subject to any disclaimer, the term of this patent is extended or adjusted under 35 U.S.C. 154(b) by 281 days.

(21) Appl. No.: 16/941,942

(22) Filed: Jul. 29, 2020

(65) Prior Publication Data

US 2021/0033743 A1 Feb. 4, 2021

(30) Foreign Application Priority Data

Aug. 1, 2019 (GB) ..................................... 1911009

(51) Int. Cl.
| | | |
|---|---|---|
| *G01V 3/08* | (2006.01) | |
| *G08B 21/18* | (2006.01) | |
| *G01P 13/02* | (2006.01) | |
| *G08B 7/06* | (2006.01) | |

(52) U.S. Cl.
CPC ................ *G01V 3/08* (2013.01); *G01P 13/02* (2013.01); *G08B 21/182* (2013.01); *G08B 7/06* (2013.01)

(58) Field of Classification Search
CPC .......... G01V 3/08; G01P 13/02; G08B 21/182
See application file for complete search history.

(56) References Cited

U.S. PATENT DOCUMENTS

| | | | |
|---|---|---|---|
| 7,113,092 B2 | 9/2006 | Keene | |
| 2004/0135687 A1* | 7/2004 | Keene | G01V 11/00 340/572.6 |
| 2004/0169509 A1* | 9/2004 | Czipott | G01V 3/15 600/409 |
| 2008/0136408 A1* | 6/2008 | Andra | G01V 3/08 324/228 |
| 2008/0255779 A1* | 10/2008 | Hull | G01R 29/12 702/57 |
| 2015/0279189 A1* | 10/2015 | Keene | G01V 11/002 340/540 |
| 2016/0008091 A1* | 1/2016 | Saotome | A61B 90/90 340/572.1 |
| 2018/0180499 A1* | 6/2018 | May | G01L 3/105 |

FOREIGN PATENT DOCUMENTS

| | | |
|---|---|---|
| GB | 2469433 A | 10/2010 |
| WO | 2019034867 A1 | 2/2019 |

OTHER PUBLICATIONS

Examination Report dated Jan. 15, 2020 of corresponding British application No. 1911009.7; 7 pages.

* cited by examiner

*Primary Examiner* — Alvaro E Fortich
(74) *Attorney, Agent, or Firm* — Maier & Maier, PLLC (57) ABSTRACT

An apparatus including two or more spaced apart ferromagnetic sensors arranged to detect and screen ferromagnetic objects, and, when a ferromagnetic object is detected, the screening is configured to be substantially independent of the sensor-object distance.

17 Claims, 5 Drawing Sheets

FERROMAGNETIC SENSING

FIELD

The invention relates to ferromagnetic detection. In particular, though not exclusively, the invention relates to uniform sensitivity in ferromagnetic detection.

BACKGROUND

Ferromagnetic sensors are used to detect ferromagnetic containing objects (e.g. objects containing iron). Some non-limiting examples include: to detect and prevent ferromagnetic objects being taken into an MRI room (e.g. U.S. Pat. No. 7,113,092); to screen for dangerous weapons like assault rifles, while at the same time ignoring smaller non-threat objects like mobile phones; and to detect contraband items (like mobile phones and improvised knives) in controlled spaces like detention centres.

Ferromagnetic sensors generally work by measuring the magnetic field produced by a magnetic moment of a ferromagnetic object. More particularly, these sensors measure the change in the local magnetic field caused by the magnetic moment of a nearby ferromagnetic object. The local field being the Earth's magnetic field together with any local sources. The change in the local magnetic field being an indication that a ferromagnetic object is nearby, and has caused the fluctuation. As a general rule, the larger the magnetic moment of the object, the larger the disruption/fluctuation caused. As a further generalization, where all other things are equal, the more ferromagnetic material in an object, the greater the magnetic moment of the object.

The effective operation of a ferromagnetic sensor is discussed further below. Also, for simplicity, hereafter unless stated otherwise, the term 'object' refers to an object having a magnetic moment, and the term 'sensor' refers to a ferromagnetic sensor.

It is well known that the magnetic field strength (B) produced by an object (having a magnetic moment m) decays exponentially as you move away from the object. More specifically, this can be mathematically generalised as:

$$B \propto \frac{m}{r^3} \qquad \text{Eq. 1}$$

where B is the size of the magnetic field at a distance r away from the object. Equation 1 is illustrated graphically in FIG. 1.

Figure 1:
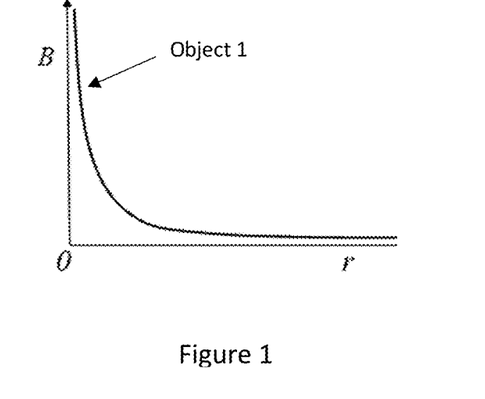
FIG. 1 is a graph showing the magnetic field (B; on the vertical axis) from the magnetic moment of an Object 1 at distance (r; on the horizontal axis) from the origin.

In FIG. 1, Object 1 (having a magnetic moment of m1) is shown at different distances (r) away from the sensor, the sensor located at r=0. Therefore, it can be seen that as Object 1 is moved away from a sensor, the magnetic field at the sensor drops away rapidly. As such, as r increases, 8 rapidly decreases to the baseline level.

Figure 2:
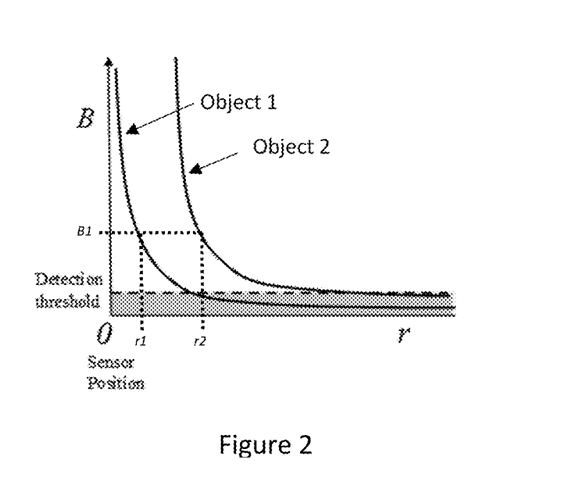
FIG. 2, like FIG. 1 is a graph showing the magnetic field from a magnetic moment of Object 1 at distance r from the origin, and the magnetic field from a magnetic moment of Object 2 at distance r from the origin. When Object 1 is at r1 and Object 2 is at r2 they have the same magnetic field at the origin i.e. B1.

FIG. 2 is the same as FIG. 1, but includes a further object, Object 2 (with a larger magnetic moment m2). While Object 2 generates a stronger magnetic field than Object 1, the field strength is still subject to the rapid decay with distance r.

As a result of this rapid decay in magnetic field strength with distance, it can be difficult to discriminate between a 'weak' object close up and a 'strong' object further away. Weak and strong referring to relative magnetic moments. For example, with reference to FIG. 2, Objects 1 and 2 give the same field strength (B1) at the sensor when Object 1 is at r1, and Object 2 is further away at r2. In effect, from the sensor's standpoint, the objects would appear to be identical.

In practice, to compensate for the rapid decay in the magnetic field produced by an object with distance, it is known in the prior art to use spaced apart sensors. This is a bit like using two partially overlapping flashlights, the second flashlight being used to illuminate a dim area not well covered by the first flashlight. As such, if wishing for example to screen a doorway for passing ferromagnetic objects, the ferromagnetic sensors are placed on either side of the doorway. If only one sensor were used, a ferromagnetic object might evade detection by passing through the doorway, but along the side most remote from the sensor (i.e. where the sensitivity is weakest).

Figure 3:
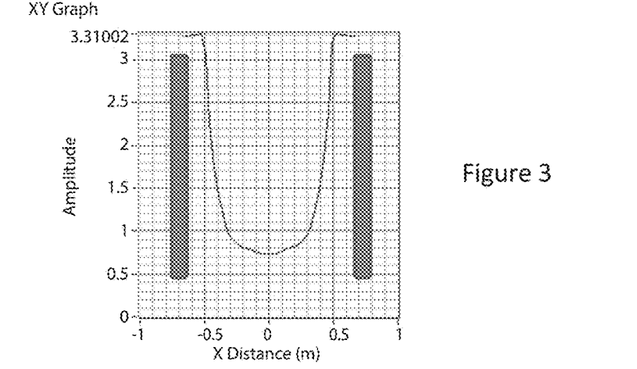
FIG. 3 is a frontend view graphical simulation of the detection sensitivity profile of a ferromagnetic sensors system with sensors in poles on either side of the portal. The U-shaped sensitivity profile of this prior art set up is shown in the Z-X plane (i.e. in the vertical plane of the doorway).
Figure 4:
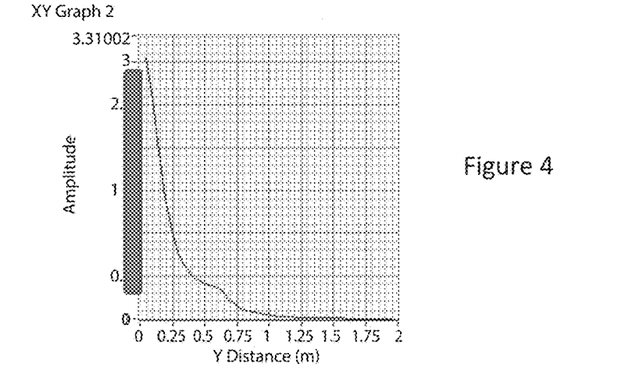
FIG. 4 is a side end view of the graphical simulation shown in FIG. 3. The half U-shaped sensitivity profile is shown in the Z-Y plane (i.e. in the vertical plane normal to the doorway).
Figure 5:
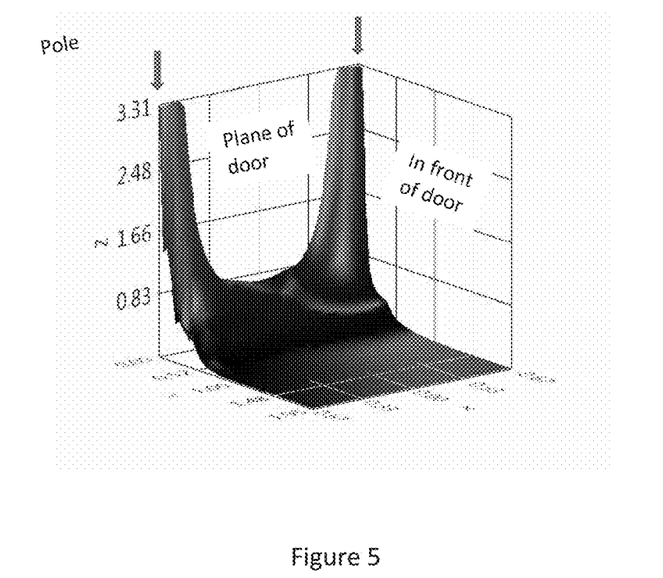
FIG. 5 is a 3D perspective view of the graphical simulation shown in FIGS. 3 and 4. The sensitivity is shown in the Z-Y-X planes. The U-shape profile in the plane of the doorway in combination with the half U-shaped profile extending out of the doorway can be visualised in this manner.

By placing sensors on either side of a doorway (portal, passageway etc. leading to an area to be protected), like in the prior art, this gives a detection sensitivity profile corresponding to that shown in FIGS. 3, 4 and 5.

From FIGS. 3 and 5, it can be seen that a U-shaped detection sensitivity profile is obtained in the plane of the doorway. That is, the sensitivity is much greater near each side of the doorway (i.e. nearest the sensors) and much less sensitive in the middle of the doorway (i.e. in the region corresponding to the bottom of the U-shape).

Therefore, in the prior art, if all objects of interest are to be detected as they pass through the doorway, these objects must be detectable in the middle of the doorway (i.e. in the region corresponding to the bottom of the U-shape, where the sensitivity is lowest). As a consequence, the detection threshold of the sensors is set so as to correspond to the object's field strength when located in the middle of the doorway. In the prior art, an alert is generated if either sensor detects the object of interest. So, if a protected doorway of the kind described above in the prior art were set to detect an assault rifle at the point corresponding to the bottom of the U-shape, the rifle would also be detected at all points closer to each sensor.

However, problems arise when it is desirable to have a system which discriminates between larger and smaller objects (in this case, 'smaller' and 'larger' are referring to the object's respective magnetic moments). For example, to screen for and detect objects like an assault rifle, but to ignore more innocuous items like a mobile phone (i.e. cell phone). Problems arise in such systems because, as explained above with reference to Objects 1 and 2 (in FIG. 2), an assault rifle in the middle of the doorway could give a magnetic field at the sensor which is the same as a mobile phone much closer to the sensor. This means that multiple 'false alerts' could be generated by innocuous items when trying to screen a body of people looking for just assault weapons. False alerts cause worry and can waste time and resources. At worse, when 'false alerts' are frequent, this could lead to a lack of diligence by any person responsible for monitoring the doorway. A failure to detect a dangerous weapon could have serious and potentially lethal consequences. Similarly, inadvertently allowing a ferromagnetic object into a MRI room is dangerous, as these items can be turn into dangerous metal projectiles.

There remains a need in the art for improve ferromagnetic sensing capabilities.

SUMMARY

In a first aspect of the invention, there is provided
an apparatus comprising two or more spaced apart ferromagnetic sensors arranged to detect and screen ferromagnetic objects, wherein when a ferromagnetic object is detected the screening is configured to be substantially independent of the sensor-object distance.

In a second aspect of the invention, there is provided an apparatus for detecting and screening ferromagnetic objects comprising two or more spaced apart ferromagnetic sensors, the ferromagnetic sensors arranged to measure a magnetic field associated with a ferromagnetic object moving up to and/or past the ferromagnetic sensors, to produce measurement signals, wherein the apparatus is configured to process the measurement signals to give a processed output, wherein the processing comprises compensating for a non-linear decrease in the strength of the magnetic field produced by the ferromagnetic object with increased object-sensor distance, and wherein the apparatus is arranged to produce an alert if the processed output exceeds an alert threshold.

The invention in effect, seeks to deliver a uniform screening capability between at least two sensors, and as such, the object screening is not strongly dependent on object-sensor distance (unlike the prior art).

There are several ways which may be adopted to achieve uniform screening between at least two magnetic sensors. In the main, the approaches describe below rely on interrelating the information from the two sensors, rather than treating each sensor as an independent sentry unit (as is the case in the prior art). In effect, the invention delivers more than the sum of its parts.

For example, the information obtained from the two spaced apart sensors can be used to inferred the magnetic moment (or value corresponding to, or proportional to the magnetic moment) of the detected object. The magnetic moment of the object is an absolute property, and is not dependent on object-sensor distance. As such, the magnetic moment of a mobile phone is the same in the middle of a pair of sensors as it is when closer to the magnetic sensors. Likewise, the magnetic moment of a rifle will be the same in the middle of a pair of sensors as it is when closer to the magnetic sensors. The magnetic moment of a rifle is of course much larger than the magnetic moment of a mobile phone, and so when screening for magnetic moment, there is little chance a mobile phone could be mistaken for a rifle. In this way false alarms are greatly reduced if not eliminated.

There are many ways within the scope of this invention in which to use the information from at least two spaced apart ferromagnetic sensors to determine the magnetic moment (or value corresponding to, approximating, or proportional to the magnetic moment) of an object. One of the most comprehensive ways to determine the magnetic moment of an object is to analyse the evolving magnetic signals as the object approaches the sensors, and to analyse the signals via a set of mathematical functions called Anderson Functions. There are three Anderson Functions and magnetic signals comprise a linear combination of these three. For example, if we call the three functions $f_1$, $f_2$, $f_3$ then for example the output from the sensor may be described by:

$$V = k_1 f_1 + k_2 f_2 + k_3 f_3$$

where $k_1$, $k_2$, $k_3$ are the coefficients or 'weights' of the functions.

$$f_1 = \frac{1}{(\theta^2+1)^{5/2}}, f_2 = \frac{\theta}{(\theta^2+1)^{5/2}}, f_3 = \frac{\theta^2}{(\theta^2+1)^{5/2}}$$

where $\theta = x/a$

Figure 6:
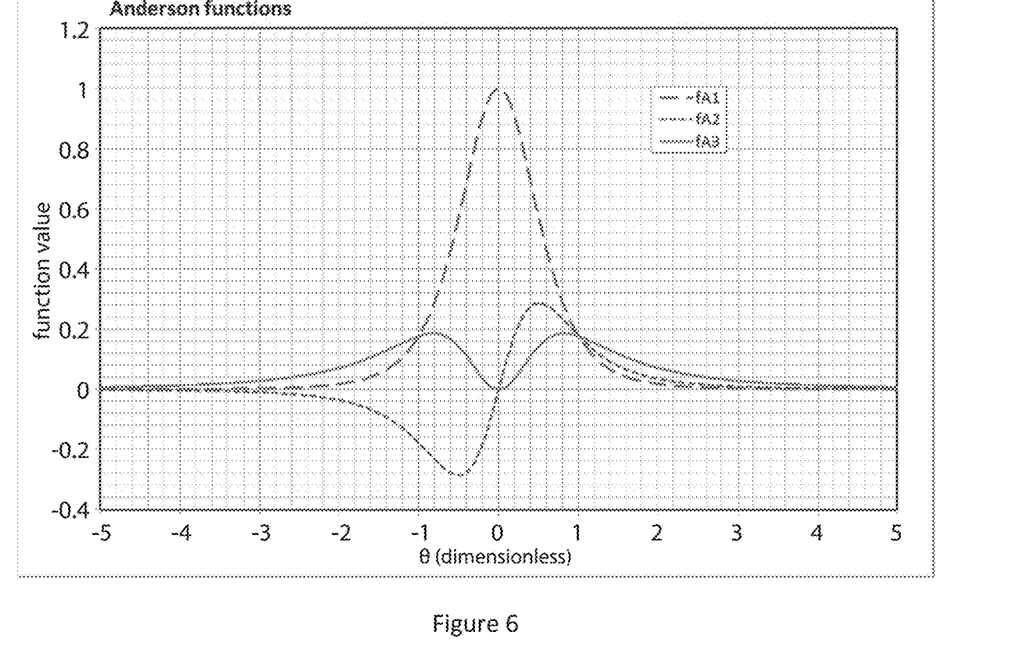
FIG. 6 is a graphical representation of the Anderson Functions.

In this regard, we refer to FIG. 6, which shows the Anderson functions graphically.

In this case, the resulting signals at the magnetic sensor can be solved to determine $\theta = x/a$ and hence the distance, a, to the sensor at x=0. The same can be done for a second sensor on the opposite side of the channel, the for a distance b, such that a+b=the separation of the magnetic sensors.

Once the position of the target is known with respect to the two sensors, the magnetic moment of the target can be determined, because it has a well-known relationship to the measured fields at both sensors.

$$B_1 = K_1 \frac{m}{a^3}, B_2 = K_2 \frac{m}{b^3}$$

which can be solved simultaneously to find the magnetic moment, m.

In summary, by using the information obtained from two spaced apart sensors, the absolute m value can be determined, which is independent of the sensor-object distance. There are other ways within the scope of the invention to mathematically treat the information from the at least two sensors to obtain the magnetic moment of the detected object (or value corresponding to, approximating, or proportional to the magnetic moment of the object), but in the interest of brevity and mathematical elegance, the other methods are not elaborated further here.

Figure 7:
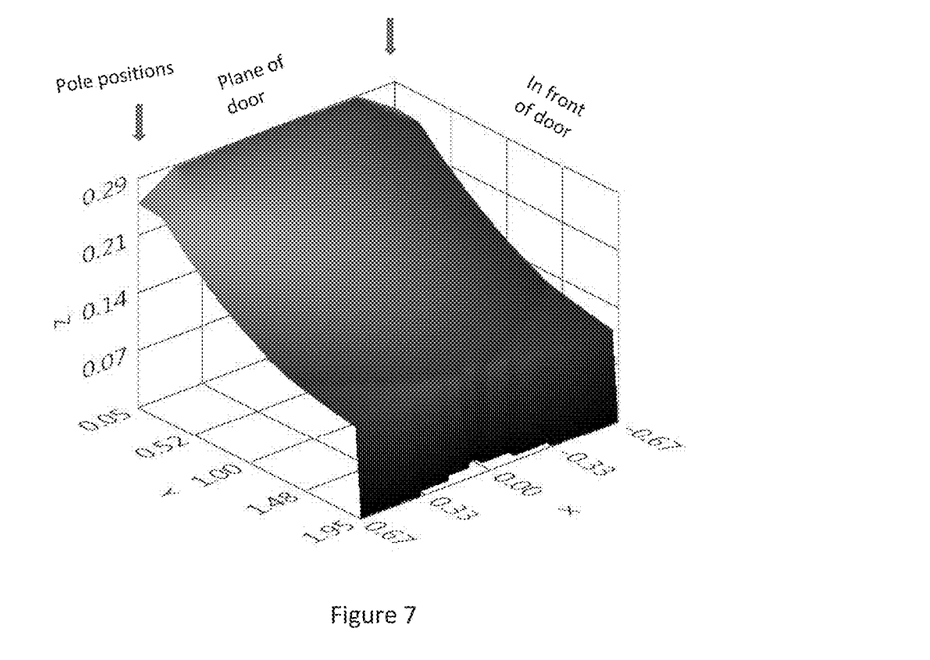
FIG. 7 is a 3D perspective view of a graphical simulation of the detection sensitivity profile of ferromagnetic sensors, the sensors in poles on either side of the portal, and where a uniform sensing treatment has been applied. Like in FIG. 5, the sensitivity is shown in the Z-Y-X planes. Unlike in FIG. 5, it does not share the limiting U-shape and half U-shaped profile.

To illustrate the benefits of the invention, FIG. 7 shows a detection sensitivity profile modelled in a doorway where a uniform sensing treatment has been applied. At once, it can be seen that this is a great step forward as compared to the sensing profile shown in FIG. 5. There is no longer the steep U-shaped drop in sensitivity between the sensors. Indeed, even sensing out of the plane of the doorway is incredibly uniform, decaying substantially evenly, and remaining flat in the plane parallel to the doorway (i.e. in the X axis). As somewhat of an aside, a mathematical treatment can also be used generate the somewhat abrupt cut-off point seen at the end of the profile, i.e. where Y=1.95. This truncating treatment can be useful in limiting the 'reach' of the sensors beyond the plane of the doorway. For example, this might be useful in preventing false alarms linked to a person passing close to, but not actually through the doorway.

In summary, by using a system in effect indexed to the magnetic moment of the object (rather than the prior art way of applying the detection threshold index to magnetic fields), this gives amazingly uniform detection capabilities as illustrated in FIG. 7.

Figure 8:
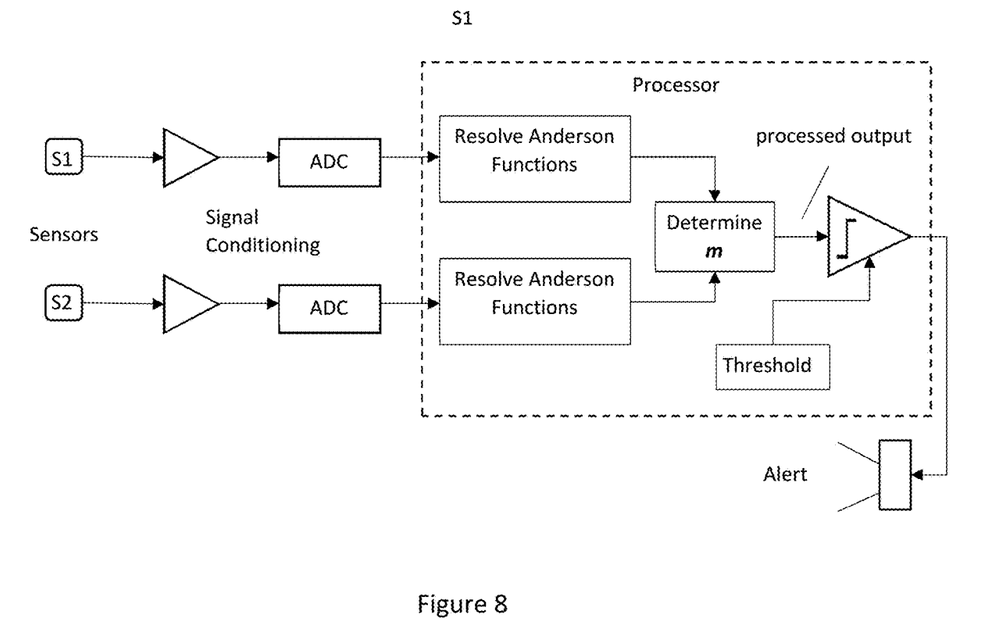
FIG. 8 shows a block diagram utilising the Anderson functions.

FIG. 8 shows a block diagram utilising the Anderson functions. In this example, S1 and S2 detect the magnetic field local to each sensor, there is some standard signal processing before the Anderson functions are resolved by a processor for each of the two sensors, from this the magnetic moment m is determined. If m exceeds the set threshold, an alert is triggered.

In further support of the invention, the experimental section of this application provides some experimental data comparing a uniform sensing of the invention with the prior art system.

Another illustrative example of a simple way to configure the at least two spaced apart sensors to detect and screen ferromagnetic objects, such that screening is substantially independent of the sensor-object distance is described below.

This embodiment is explained with reference to FIG. 9. This can be envisaged as sensor S1 and sensor S2 spaced a part (perhaps spanning a doorway). In the prior art, as explained above, the detection threshold (shown as DT1) would be set to equate to the target object's field when located at the mid-point (shown here as P0). The alert is triggered when S1 or S2 senses the target object.

However, in this embodiment of the invention, the detection threshold is set lower than the prior art example (shown as DT2). In this case, the target threshold for S1 will be set to sense the target object when at location P2, e.g. a location near S2. Likewise, the target threshold for S2 will be set to sense the target object when at location P1, e.g. a location near S1. In this case the alert is triggered only when both S1 and S2 both sense the target object. That is, the sensor outputs from S1 and S2 are combined using a logical AND function (see FIG. 10). As such, only targets that are seen by both sensors cause an alert. So, while an object smaller than the target object might trigger one sensor (by being very close to it), it will never trigger both.

So, in summary, in this arrangement the target object is sensed uniformly between P1 and P2, and hence the screening has been configured via positional and electronic elements, to be substantially independent of the sensor-object distance. FIG. 10 shows an illustrative block diagram of the system used in FIG. 9, showing the processed S1 and S2 outputs (when each exceeds their respective priming threshold) being combined with an AND function to generate an alert.

In an embodiment ferromagnetic sensors are selected from any one of the group fluxgates, amorphous magneto-resistive (AMR) sensor, and induction coils.

In an embodiment, the ferromagnetic sensors are arranged to measure an ambient magnetic field, and to measure a change in the ambient magnetic field associated with a ferromagnetic object moving up to and/or past the ferromagnetic sensors. In an embodiment, the apparatus comprises a signal processing means arranged in communication with the ferromagnetic sensors, and configured to produce the processed output. For example, the signal processing means could be a suitable programmed, computer, computer chip or circuit board. In an embodiment, the apparatus comprises an alert means operable by the processed output from the signal processing means. In an embodiment, the signal processing means is configured to determine if the alert threshold has been exceeded, and further configured to send an alert output to the alert means, and wherein the alert means raises an alert if the alert output indicates that the alert threshold has been exceeded. In an embodiment, each sensor has a zone of sensitivity. In an embodiment, the zone of sensitivity is big enough to encompass a person. In an embodiment, the magnetic field includes the magnetic field or its gradient.

In a third aspect of the invention, there is provided
an apparatus for detecting and screening ferromagnetic objects comprising
two or more ferromagnetic sensor spaced apart by a separation distance, the ferromagnetic sensors adapted to measure an ambient magnetic field and to produce a corresponding measurement signal;
a signal processing means arranged in communication with the ferromagnetic sensors, and an alert means operable by an alert output from the signal processing means, and wherein:
the signal processing means is configured to identify temporal variations in the measurement signals, the variations associated with the magnetic field produced by the ferromagnetic object moving up to and/or past the ferromagnetic sensors,
and in which the signal processing means is configured to at least process the measurement signals to compensate for a non-linear decrease in the strength of a magnetic field produced by the ferromagnetic object with increased object-sensor distance, and to produce a processed output,
wherein the apparatus is arranged to produce an alert if the processed output exceeds an alert threshold, exceeding the threshold indicative of the presence of a suspicious ferromagnetic object approaching and/or passing the ferromagnetic sensors.

In an embodiment, the processing the measurement signals comprises determining the magnetic moment, or value corresponding to or proportional to the magnetic moment, of the ferromagnetic object approaching or passing the ferromagnetic sensors, and wherein the apparatus is arranged to produce an alert if the magnetic moment, or value corresponding to or proportional to the magnetic moment, exceeds an alert threshold. As explained above, magnetic moment is a property of the object and independent of object-sensor distance.

In an embodiment, the ferromagnetic sensors are spaced apart by a separation distance, the separation distance defining a screening zone.

In an embodiment, an approach limiting means prevents objects from getting within a minimum approach distance from the magnetic sensors. In an embodiment the screening zone is the separation distance discounting any distance lost to an approach limiting means.

In an embodiment, the apparatus is configured to:
(a) identify the object as suspicious in at least 80% of the screening zone;
and
(b) identify the object as non-suspicious in at least 50% of the screening zone.

In an embodiment, the apparatus is configured to identify the object as suspicious in at least 80, 85, 90, 95, 96, 97, 98, 99, 99.5, 99.8 or 100% of the screening zone. In an embodiment, the apparatus is configured to identify the object as suspicious in at least 100% of the screening zone. In an embodiment, the apparatus is configured to identify the object as non-suspicious in at least 50, 60, 70, 80, 85, 90, 95, 96, 97, 98, 99, 99.5, 99.8 or 100% of the screening zone.

In an embodiment, the apparatus is configured to identify the object as non-suspicious in at least 80, 90, 95, 98, 99 or 100% of the screening zone when the non-suspicious object is 20% or smaller than the target object (target object equating to a suspicious object). Optionally, at least 95% of the screening zone when the non-suspicious object is 20% or smaller than the target object.

In an embodiment, the apparatus is configured to identify the object as non-suspicious in at least 80, 90, 95, 98, 99 or 100% of the screening zone when the non-suspicious object is 40% or smaller than the target object. Optionally, at least 95% of the screening zone when the non-suspicious object is 40% or smaller than the target object.

In an embodiment, the apparatus is configured to identify the object as non-suspicious in at least 80, 90, 95, 98, 99 or 100% of the screening zone when the non-suspicious object is 50% or smaller than the target object. Optionally, at least 90% of the screening zone when the non-suspicious object is 50% or smaller than the target object.

In an embodiment, the apparatus is configured to identify the object as non-suspicious in at least 80, 90, 95, 98, 99 or 100% of the screening zone when the non-suspicious object is 60% or smaller than the target object. Optionally, at least 85% of the screening zone when the non-suspicious object is 60% or smaller than the target object.

In an embodiment, the apparatus is configured to identify the object as non-suspicious in at least 40, 50, 60, 70, 80, 90, 95, 98, 99 or 100% of the screening zone when the non-suspicious object is 70% or smaller than the target object. Optionally, at least 60% of the screening zone when the non-suspicious object is 70% or smaller than the target object.

In an embodiment, the apparatus is configured to identify the object as non-suspicious in at least 10, 20, 30, 40, 50, 60, 70, 80, 90, 95, 98, 99 or 100% of the screening zone when the non-suspicious object is 80% or smaller than the target object. Optionally, at least 20% of the screening zone when the non-suspicious object is 80% or smaller than the target object.

In an embodiment, the apparatus is configured to identify the object as non-suspicious in at least 95% of the screening zone when the non-suspicious object is 20% or smaller than the target object; and in at least 95% of the screening zone when the non-suspicious object is 40% or smaller than the target object; and at least 90% of the screening zone when the non-suspicious object is 50% or smaller than the target object; and at least 85% of the screening zone when the non-suspicious object is 60% or smaller than the target object; and at least 60% of the screening zone when the non-suspicious object is 70% or smaller than the target object; and at least 20% of the screening zone when the non-suspicious object is 80% or smaller than the target object.

Where the target object is smallest object (e.g. smallest magnetic moment) the sensor is designed to generate an alert in response to detecting.

In an embodiment, the object is identified as suspicious when the alert threshold is exceeded, and is identified as non-suspicious, or is ignored, if the alert threshold is not exceeded.

In an embodiment, the ferromagnetic sensors are spaced apart by a separation distance and the separation distance is the distance between a first and a second ferromagnetic sensor. In an embodiment, the screening zone comprises an area in a plane between the first and second ferromagnetic sensors. In an embodiment, the plane is normal to the ground, or the plane is parallel to the ground. In an embodiment, the processed output corresponds to, or is proportional to, the magnetic moment value of the screened object. In an embodiment, the threshold is a non-linear threshold, the threshold being indexed to the sensor-object distance.

In an embodiment, the alert threshold corresponds to at least 50, 60, 70, 80, 90, 95 or 100% of the processed output generated by the smallest suspicious ferromagnetic object of interest.

In an embodiment, the alert threshold corresponds to at least 50, 60, 70, 80, 90, 95 or 100% of the magnetic moment of an unloaded handgun, such as a GLOCK 19 Gen4 pistol in 9 mm Luger as manufactured 1 Jan. 2019, and wherein the gun is traveling at a speed of 1 m/s, and in which the longitudinal direction of the gun barrel is orientated parallel to the ground and wherein the handle is orientated in a plane normal to the ground and normal to a plane between two ferromagnetic sensors of the apparatus.

In an embodiment, the alert threshold corresponds to at least 50, 60, 70, 80, 90, 95 or 100% of the magnetic moment of a battery-free iPhone 8 with a 4.7-inch display, as manufactured 1 Jan. 2019, and wherein the phone is traveling at a speed of 1 m/s, and in which the screen is orientated in a plane normal to the ground and normal to a plane between two ferromagnetic sensors of the apparatus.

In an embodiment, the apparatus is configured to monitor the doorway to a room, such as the doorway to an MRI room or the entrance to a school. In an embodiment, the apparatus is configured to monitor the way into any one of: sport arena; entertainment area, shopping mall; concert hall; theatre; hotel; hotel complex; holiday resort; restaurant; night club; outdoor event (e.g. New Year, public holiday event, or Independence Day), festival; visitor attraction; school, university, religious building or site (e.g. church, mosque; synagogue, temple), office; office building, press, airport; tube station; metro station, bus station, airplane, bus, train, army base; police building; security building, governmental building; embassy, court; nuclear power station; power infrastructure, public infrastructure, factory, hospital, prison, home and residential compound. In an embodiment, the apparatus is configured to screen people or objects in a controlled space, such as a prison, military/police base, check point, airport, arena, area of worship, hospital, MRI room, school, meeting room or data center.

In an embodiment, the apparatus comprises means to reduce false alerts. Reducing false alarms prevent wasted time and improves user compliance. In an embodiment, the apparatus comprises means to detect the direction of travel of the ferromagnetic object, or person carrying the ferromagnetic object. In some cases, there is no need to trigger an alert if for example the detected object is leaving a location. For example, a metal object headed away from an MRI room could be safely ignored, but not the converse.

In an embodiment, the apparatus comprises trespass and/or motion sensors. In an embodiment, the apparatus comprises twin beams and means to determine if the beams have been broken, and the order in which the beams have been broken. The order in which the beams are broken, can give information as to which direction a person (carrying the ferromagnetic object) is moving in, e.g. towards or away from a protected location.

In an embodiment, the apparatus comprises a door, the door closing a doorway. In an embodiment, the apparatus comprises a door sensing means.

In an embodiment, the apparatus comprises an audible and/or visual alert means. It may even be sensed by touch, like a vibrational alert. Alerts may take any reasonable form, as long as it conveys the alert in a way that an action can be taken in response to the alert. For example, if the alert indicates a weapon, a security guard may be informed covertly. If the alert indicates that a ferromagnetic object is entering an MRI room, the alert my be visual and/or audible. It might also prevent a door or turnstile from opening.

In an embodiment, the apparatus comprises an alert beacon. In an embodiment, the beacon comprises lights, the lights colour-coded to indicate the relative threat of a detected ferromagnetic object. In an embodiment, the apparatus is arranged in an archway. An archway can be conveniently fixed in or around a doorway or passageway. In an embodiment, the apparatus comprises a remote alert. In an embodiment, the apparatus comprises an alert suppression means. In some circumstances, having a way to temporally suspend the alert can be useful. For example, to allow workman carrying tools, or a guard with a weapon, to pass without triggering an alert.

In an embodiment, the apparatus comprises means to identify and/or indicate the location of the suspicious object. For example, a light might illuminate at the height which the object of interest is located. For example, a waist-height light might indicate a concealed weapon in a waistband.

In an embodiment, the apparatus comprises a machine learning capability. Machine learning can be used to refined detection. The machine learning capability could be within the apparatus or linked to remotely via a connection. For example, housed in the cloud. Many such units of the apparatus of the invention could be linked together and they might learn from each other. In an embodiment, the apparatus comprises or is linked to a data storage means to store historic and acquired data. In an embodiment, the apparatus is linked to a network, optionally the network connects one or more of the apparatuses together, and wherein these may share historic or acquired data. In an embodiment, the apparatus comprises means to recognize a person, and/or identify if a person is acting unusually and/or suspiciously. The apparatus could be connected to CCTV and/or a database which stores for example biometric information.

In an embodiment, the ferromagnetic sensors are spaced apart by at least 10, 20, 30, 40, 50, 60, 70, 80, 90, 100, 110, 120, 130, 140, 150, 160, 170, 180, 190 or 200 cm. In an embodiment, the apparatus comprises a single elongate pole, the ferromagnetic sensors spaced apart vertically within the pole.

In an embodiment, the apparatus is battery powered. In an embodiment, the apparatus is portable, optionally being carried and setup by one person. In an embodiment, the time taken to set up the apparatus is less than one minute. Portable units have the advantage that they can be set up anywhere and quickly. For example, in prisons, access to power sockets can be highly restricted. Also, portability allows areas to be screened with little or no warning given to potential suspects.

In an embodiment, the apparatus transmits a detection field, the detection field eliciting a response from a metal object and wherein the ferromagnetic detectors are metal detectors configured to detect the elicited response.

In a fourth aspect of the invention, there is provided use of the apparatus as defined in the first aspect, to screen for contraband or other prohibited ferromagnetic objects.

In an embodiment, the use of the apparatus, the apparatus as defined in the previous aspects, to screen for suspicious ferromagnetic objects being carried in, or into, a controlled space, such as in a prison, military/police base, check point, airport, arena, area of worship, hospital, MRI room, school, meeting room or data center. In an embodiment, the use of the apparatus of the first aspect, configured to monitor a doorway, portal, passage, entrance, way in etc. to a room, such as the doorway to an MRI room or the entrance to a school. In an embodiment, the apparatus is configured to monitor the way into any one of: sport arena; entertainment area, shopping mall; concert hall; theatre; hotel; hotel complex; holiday resort; restaurant; night club; outdoor event (e.g. New Year, public holiday event, or Independence Day), festival; visitor attraction; school, university, religious building or site (e.g. church, mosque; synagogue, temple), office; office building, press, airport; tube station; metro station, bus station, airplane, bus, train, army base; police building; security building, governmental building; embassy, court; nuclear power station; power infrastructure, public infrastructure, factory, hospital, prison, home and residential compound. In an embodiment, the apparatus is configured to screen people or objects in a controlled space, such as a prison, military/police base, check point, airport, arena, area of worship, hospital, MRI room, school, meeting room or data center.

In a fifth aspect of the invention, there is provided
a method of screening ferromagnetic objects, comprising the steps of:
(a) measuring an ambient magnetic field or its gradient using passive sensing means comprising two or more spaced apart magnetic sensors, and producing corresponding measurement signals;
(b) identifying any temporal variations in the measurement signals associated with a ferromagnetic object moving up to and/or past the ferromagnetic sensors
(c) processing the measurement signals to compensate for a non-linear decrease in the strength of a magnetic field produced by the ferromagnetic object with increased object-sensor distance, and to produce a processed output,
(d) producing an alert if the processed output exceeds an alert threshold, the threshold indicative of the presence of a suspicious ferromagnetic object approaching and/or passing the ferromagnetic sensors.

In an embodiment of the method, the signal processing means sends an alert output to the alert means, and wherein the alert means raises an alert if the alert output indicates that the alert threshold has been exceeded.

In an embodiment of the method,
in step (c), processing the measurement signals comprises determining if each of the measurement signals has exceeded a respective priming alert threshold; and wherein,
in step (d), an alert is produced if the processed output indicates that at least two of the measurement signals have exceeded their respective priming alert thresholds, or optionally each of the measurement signals has exceeded their respective priming alert thresholds, this being indicative of a suspicious ferromagnetic object approaching and/or passing the ferromagnetic sensors.

In an embodiment of the method, the processed output corresponds to, and/or is proportional to, the magnetic moment of the screened object.

In an embodiment of the method, the alert threshold corresponds to at least 50, 60, 70, 80, 90, 95 or 100% of the processed output generated by the smallest suspicious ferromagnetic object of interest. In some circumstances, it may be prudent to capture items starting smaller than the target object, to ensure that all target objects are captured (i.e. to err on the side of caution).

In an embodiment of the method, the alert threshold is calibrated by placing or moving a suspicious ferromagnetic object between the spaced apart magnetic sensors and adjusting the alert threshold until the object is only just detected; and/or wherein the alert threshold is calibrated by placing a non-suspicious ferromagnetic object between the spaced apart magnetic sensors and adjusting the alert threshold until the object is only just not detected.

In an embodiment of the method, the magnetic moment of the non-suspicious object is at least 10, 20, 40, 50, 60, 70, 80, 90, 95 or 95% of the magnetic moment of the suspicious object.

In an embodiment of the method, the calibrating objects are placed equidistant between the spaced apart magnetic sensors.

In an embodiment of the method, suspicious ferromagnetic objects are detected and identified as suspicious in at least 80, 85, 90, 95, 96, 97, 98, 99, 99.5, 99.8 or 100% of the screening zone; and/or wherein non-suspicious ferromagnetic objects are detected and identified as non-suspicious in at least 50, 60, 70, 80, 85, 90, 95, 96, 97, 98, 99, 99.5, 99.8 or 100% of the screening zone.

In an embodiment of the method, suspicious ferromagnetic objects are detected and identified as suspicious in at least 100% of the screening zone.

In an embodiment of the method, the apparatus of the first aspect is used.

The present invention will now be further described with reference to the following non-limiting examples and the accompanying illustrative drawings, of which:

BRIEF DESCRIPTION OF THE DRAWINGS

Like features have been given like reference numerals.

DETAILED DESCRIPTION

In FIG. 1, Object 1 (having a magnetic moment of m1) is shown at different distances (r) away from the sensor, the sensor located at r=0. Therefore, it can be seen that as Object 1 is moved away from the sensor, the magnetic field (B) at the sensor drops away rapidly.

FIG. 2 is the same as FIG. 1, but includes a further object, Object 2 (with a larger magnetic moment m2). Having a stronger magnetic moment means that the curve is offset in the r direction. While Object 2 generates a stronger magnetic field than Object 1, the field strength is still subject to the rapid decay with distance r. Objects 1 and 2 give the same field strength (B1) at the sensor when Object 1 is at r1, and Object 2 is further away at r2. In effect, from the sensor's standpoint, the objects would appear to be identical. The line along the shaded region shows a detection threshold. Where each curve crosses the detection threshold line gives the position on r where an alert will be triggered. So, Object 1 needs to be much closer to the sensor to cross the threshold (and trigger an alert) as compared to Object 2.

FIGS. 3 to 5 give respectively: frontend, side and 3d perspective views of a graphical simulation of the detection sensitivity profile of ferromagnetic sensors arranged across a portal, the sensors being simulated in poles on either side of the portal. As discussed earlier, with reference to FIG. 3, this prior art arrangement gives a U-shaped detection sensitivity profile in the plane of the doorway (i.e. in the Z-X axis). That is, the sensitivity is much greater near each side of the doorway (i.e. nearest the sensors) and much less sensitive in the middle of the doorway (i.e. in the region corresponding to the bottom of the U-shape). In FIG. 4, a half U-shaped detection sensitivity profile is obtained in the vertical plane extending out of the doorway (i.e. in the Z-Y axis). FIG. 5 is the 3D rendering of the above in the axis Z-X-Y.

FIG. 6 is a graphical representation of Anderson Functions.

FIG. 7 is a 3D perspective view of a graphical simulation of the detection sensitivity profile of ferromagnetic sensors arranged across a portal, the sensors in poles on either side of the portal, where a uniform sensing treatment has been applied. As discussed above FIG. 7 does not share the shortcomings of the U-shaped profile of the prior art.

FIG. 8 shows a block diagram utilising the Anderson functions. S1 and S2 sense the magnetic field from a magnetic dipole of an object. The signals from S1 and S2 are conditioned in a manner known in the prior art, before being transferred to a processor. Each signal is resolved via Anderson Functions, and the information from both channels is used to determine m (the magnetic moment of the object) as the processed output. The magnetic moment of an object is an absolute value and not dependent on object-sensor distance r. The magnetic moment is compared to the set threshold, and if it exceeds the threshold an alert is generated, else no alert is generated.

Figure 9:
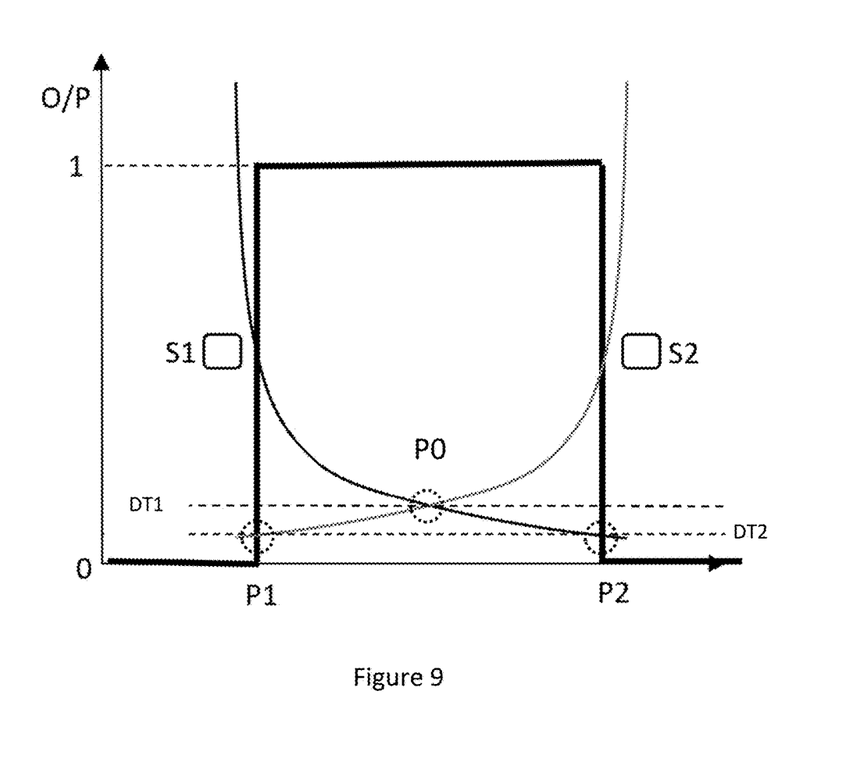
FIG. 9 shows the measured magnetic field vs distance in respect of spaced apart sensors S1 and S2, overlaid with two possible detection thresholds DT1 and DT2.
Figure 10:
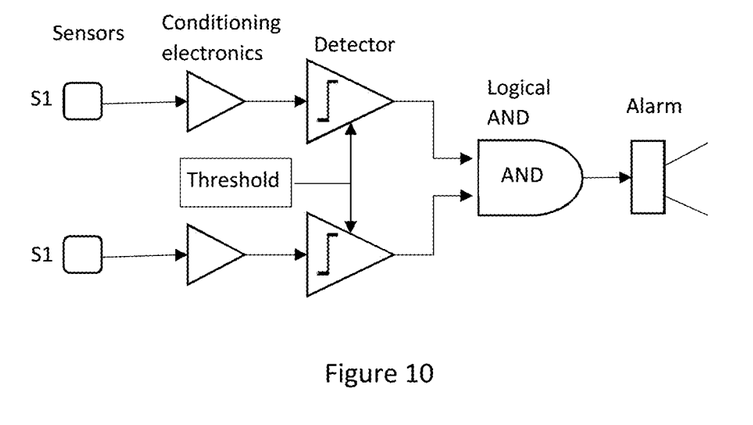
FIG. 10 shows a block diagram using a logical AND function.

FIG. 9 shows the magnetic field (i.e. the curved lines) of a target object vs distance in respect of spaced apart sensors S1 and S2. Overlaid with this are two possible detection thresholds DT1 and DT2. In the prior art, the detection threshold is set as DT1, which corresponds to the midpoint between sensors S1 and S2, as indicated at P0. If either S1 or S2 sense a magnetic field exceeding threshold DT1 an alert is generated. In an embodiment of the invention, the detection threshold is set as DT2. As such the target object will exceed the DT2 threshold for S1 at point P2 (and any positions closer to sensor S1). Also, the object will exceed the DT2 threshold for S2 at point P1 (and any positions closer to sensor S2). However, an alert is only generated in this embodiment of the invention when both S1 and S2 sense a magnetic field exceeding DT2. In the prior art arrangement, a weak object near S1 could falsely trigger an alert (appearing like a larger but more distant object). However, in the invention, while the DT2 threshold may be exceeded for S1, it will not be for S2, and so a false alert is averted.

FIG. 10 shows a block diagram using a logical AND function describe above for FIGS. 9. S1 and S2 sense the magnetic field from a magnetic dipole of an object. The signals are conditioned in a manner known in the prior art. Each signal is then compared to the threshold set for the target object, and it is determined if the threshold has been exceeded (or not) for S1 and for S2. This information is passed to the Logical AND function. If both S1 and S2 have received signals exceeding the detection threshold an alert is generated, else no alert is generated.

Figure 11:
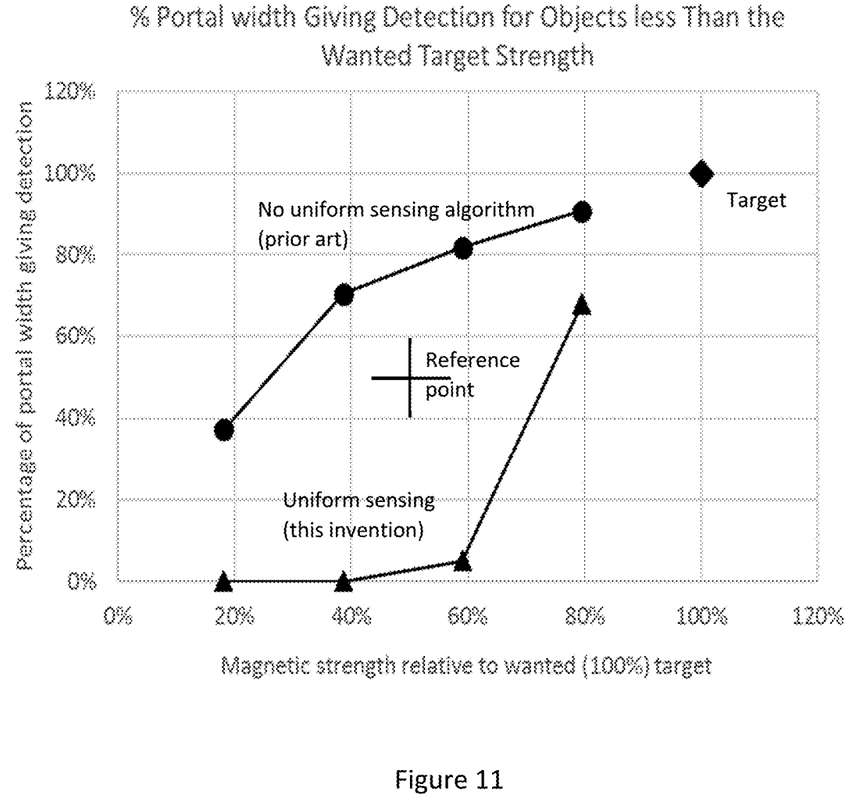
FIG. 11 is a graph showing %width of a portal giving detection as a function of % of target object strength. This relates to work described in the experimental section.

FIG. 11 is a graph showing % width of the portal (equating to sensor separation) giving an alert, as a function of % of target object strength. The results in this graph are discussed in the experimental section below and not repeated here.

EXAMPLES

Example Protocol for Uniformity Testing

In this protocol at least two targets are required.

One should be the 'target object', that is having the magnetic strength (i.e. magnetic moment) of the object to be detected.

If looking for any unusually large ferromagnetic items, a magnetic moment of above 100 mA.m$^2$, e.g. between 150 to 200 mA.m$^2$, would be acceptable, as this is slightly higher than what is normally carried by the average person, i.e. having phones and keys, etc.

By way of reference, larger modern weapons like a Colt Ar-15 rifle (unloaded) may have a magnetic moment of about 260 mA.m$^2$, whereas rifles in the Kalashnikov family (unloaded) may have magnetic moments of 860 mA.m$^2$.

A second target object of approximately half the strength of the target object is needed, e.g. 50 mA.m$^2$ if the target object's magnetic moment were 100 mA.m$^2$.

Targets could in theory be anything. That said, small permanent magnets or coils of known area and turns carrying a known electrical current are convenient sources.

For example, use of small identical rare earth magnets stuck together could be used as the target object (for use in Step 1), and for the second target object (for use in Steps 2 and 3) some of the magnets could be separated and put aside, thereby making a smaller target.

Step 1: The detection threshold for the sensors should be set such that the (larger) target object is just (but reliably detected) when it passes exactly half way between the sensors. Prior art systems would normally be set up like this in security applications. The target object should also be passed off-centre each way to verify consistent detection through any position between the sensors. So, in summary the target object is detected at all positions between the sensors, albeit only just when in the midpoint.

Step 2: The (smaller) second target object should be passed through the midpoint and should be noted to fail to be detected. Otherwise the thresholds are set incorrectly, and Step 1 needs to be repeated.

Step 3: The (smaller) second target object should be then passed through the portal (i.e. between the sensors) at increasing distances from the midpoint either way until it eventually passes very close to the sensors. If the system fails to alarm at any position, then uniform sensing is working ideally. Conversely, if alarms start to occur as the target passes closer to the sensors, then this distance should be noted, preferably as a % of the sensor separation distance.

For example, if the separation distance is 100 cm, and the second target object is detected at the 10 cm and 90 cm points (the midpoint being at 50 cm), then that would equate to 20% of the separation distance (i.e. of the 100 cm, the object is detected over a total of 20 cm of that portion). Likewise, if detection is at the 20 and 80 cm points, then this would equate to 40% of the separation distance.

The orientation of the target with respect to the sensors can cause some variability. Therefore, targets in the steps above should be passed through with consistent and constant orientation where possible. It is prudent to repeat the tests several times, in particular if the target orientations are not well known or difficult to control.

Sometimes detection can depend upon the speed of the object. If so, then a mechanism for ensuring constant speed of the targets may be used (e.g. a pendulum arrangement or a linear actuator such as a pully and motor. Of course, care must be taken to ensure any mechanism does not directly interfere with the measurements being made. However, generally for most practical purposes, hand carrying the objects at a walking pace should be acceptable when needed.

The data shown in FIG. 11 were obtained using the above protocol. The targets were made up of small identical rare-earth magnets. A stack of 5 magnets formed the (100% sized; 182 mA.m$^2$) target object. The data shown in the below table and in FIG. 11 were acquired using a stack of 1, 2, 3 and 4 of these magnets which therefore corresponded to about 20, 40, 60 and 80% of the target size respectively. A Ferroguard Assure System was used astride a MRI doorway, the doorway width was 118 cm and the sensors, in a vertical direction, where 130 cm apart.

Results and Comments

The following results were obtained using the set up described above:

| No. of Magnets | Magnetic Moment - mA · m$^2$ | % of Target Object Magnetic Moment | Using Comparative Example Sensing - % of width detected | Using Uniform Sensing - % of width detected |
|---|---|---|---|---|
| 1 of 5 | 33 | 18% | 37% | 0% |
| 2 of 5 | 70 | 39% | 70% | 0% |
| 3 of 5 | 108 | 59% | 82% | 5% |
| 4 of 5 | 145 | 80% | 91% | 68% |
| 5 of 5 | 182 | 100% | 100% | 100% |

FIG. 11 shows a graphical representation of the data given in the above table. The graph shows on the horizontal axis: the percentage of the width tested where positive (false alarm) detections occurred. The vertical axis shows the relative object strengths of the objects being tested (i.e. ~20, 40, 60 and 80% of the target object strength).

In this experiment, when no uniform sensing protocol was used (i.e. the system of the prior art), the objects tested having 20, 40 and 60% of the target object strength gave false alerts over about 40, 70 and 80% of the tested width respectively. This gives some idea of the stringency of the test being used. Remarkably, when the experiment was repeated with uniform sensing in place, effectively no false alerts where generated over the complete width tested for these target strengths.

At 80% of target object strength, when no uniform sensing was used (i.e. the system of the prior art), 90% of the portal width triggered an alert (i.e. a small 10% core midway between the sensors did not trigger an alert). By contrast, less than 70% of the tested width triggered the alert when uniform sensing was used. Given the stringency of the test, the noise and experimental variations involved, this is still a remarkably good result.

For example, it may be reasonable to extrapolate from this data that for a ferromagnetic detection setup using uniform sensing, an object of 50% of the target object strength will be detected less than 50% of positions across a portal width (indeed perhaps as little as 10%), whereas a ferromagnetic detection setup not using uniform sensing, will exhibit detection of an object of 50% of the target strength at more than 50% of positions across the portal's width (indeed, perhaps as high as 70% of the sensor separation). For example, these performance characteristics maybe (at least prima facie) diagnostic for a uniform system verses a non-uniform detection system.

In summary, these experiment show that when uniform sensing is used, it is likely that a user would not have to deal with many false alerts. An indeed, importantly, at the very least these would be far fewer than if uniform sensing of the invention were not used.

The invention claimed is:

1. An apparatus for detecting and screening ferromagnetic objects, comprising: two or more spaced apart ferromagnetic sensors arranged to detect and screen ferromagnetic objects, wherein when a ferromagnetic object is detected the screening is configured to be substantially independent of a sensor-object distance,
   wherein the ferromagnetic sensors are further arranged to measure a magnetic field associated with the ferromagnetic object moving up to and/or past the ferromagnetic sensors, to produce measurement signals,
   wherein the apparatus is configured to process the measurement signals to give a processed output, wherein the processing comprises compensating for a non-linear decrease in a strength of the magnetic field produced by the ferromagnetic object with increased object-sensor distance, and wherein the apparatus is arranged to produce an alert if the processed output exceeds an alert threshold.

2. The apparatus according to claim 1, wherein the ferromagnetic sensors are arranged to measure an ambient magnetic field, and to measure a change in the ambient magnetic field associated with the ferromagnetic object moving up to and/or past the ferromagnetic sensors.

3. The apparatus according to claim 1, wherein the apparatus comprises a signal processing means arranged in communication with the ferromagnetic sensors, and configured to produce the processed output.

4. The apparatus according to claim 3, wherein the apparatus communicates the alert based on the processed output from the signal processing means.

5. The apparatus according to claim 4, wherein the signal processing means is configured to determine if the alert threshold has been exceeded, and further configured to send an alert output, wherein the alert is communicated if the alert output indicates that the alert threshold has been exceeded.

6. The apparatus according to claim 1, wherein:
   the ferromagnetic sensors are adapted to measure an ambient magnetic field and to produce a corresponding measurement signal;
   a signal processing means arranged in communication with the ferromagnetic sensors, and wherein:
   the signal processing means is configured to identify temporal variations in the measurement signals, the variations associated with the magnetic field produced by the ferromagnetic object moving up to and/or past the ferromagnetic sensors,
   wherein the signal processing means is configured to at least process the measurement signals to compensate for a non-linear decrease in the strength of the magnetic field produced by the ferromagnetic object with increased object-sensor distance, and to produce the processed output,
   wherein the apparatus is arranged to produce the alert if the processed output exceeds the alert threshold, exceeding the threshold indicative of the presence of a suspicious ferromagnetic object approaching and/or passing the ferromagnetic sensors.

7. The apparatus according to claim 1, wherein processing the measurement signals comprises determining a magnetic moment, or value corresponding to or proportional to the magnetic moment, of the ferromagnetic object approaching or passing the ferromagnetic sensors,
   and wherein the apparatus is arranged to produce the alert if the magnetic moment, or value corresponding to or proportional to the magnetic moment, exceeds the alert threshold.

8. The apparatus according to claim 1, wherein the object is identified as suspicious when the alert threshold is exceeded, and is identified as non-suspicious, or is ignored, if the alert threshold is not exceeded.

9. The apparatus according to claim 1, wherein the ferromagnetic sensors are spaced apart by a separation distance, the separation distance defining a screening zone.

10. The apparatus according to claim 1, wherein the ferromagnetic sensors are spaced apart by a separation distance and the separation distance is a distance between a first and a second ferromagnetic sensor.

11. The apparatus according to claim 9, wherein the screening zone comprises an area in a plane between a first and second ferromagnetic sensors.

12. The apparatus according to claim 1, wherein the apparatus is configured to screen people or objects in a controlled space.

13. A method of screening ferromagnetic objects, comprising the steps of:
   (a) measuring an ambient magnetic field or its gradient using passive sensing means comprising two or more spaced apart magnetic sensors, and producing corresponding measurement signals;
   (b) identifying any temporal variations in the measurement signals associated with a ferromagnetic object moving up to and/or past the ferromagnetic sensors,
   (c) processing the measurement signals to compensate for a non-linear decrease in a strength of a magnetic field produced by the ferromagnetic object with increased object-sensor distance, and to produce a processed output,
   (d) producing an alert if the processed output exceeds an alert threshold, the threshold indicative of the presence of a suspicious ferromagnetic object approaching and/ or passing the ferromagnetic sensors.

14. The method of claim 13, wherein,
   in step (c), processing the measurement signals comprises determining if each of the measurement signals has exceeded a respective priming alert threshold; and wherein,
   in step (d), the alert is produced if the processed output indicates that at least two of the measurement signals have exceeded their respective priming alert thresholds, or optionally each of the measurement signals has exceeded their respective priming alert thresholds, this being indicative of the suspicious ferromagnetic object approaching and/or passing the ferromagnetic sensors.

15. The method of claim 13, wherein the processed output corresponds to, and/or is proportional to, a magnetic moment of the screened object.

16. The method of claim 13, wherein the alert threshold is calibrated by placing or moving the suspicious ferromagnetic object between the spaced apart magnetic sensors and adjusting the alert threshold until the object is only just detected; and/or wherein the alert threshold is calibrated by placing a non-suspicious ferromagnetic object between the spaced apart magnetic sensors and adjusting the alert threshold until the object is only just not detected.

17. The method of claim 13, wherein the method is configured to screen people or objects in a controlled space.

* * * * *